United States Patent Office 3,552,866
Patented Jan. 5, 1971

3,552,866
AUTOMATIC LEVELING TELESCOPE INCLUDING
A REVERSIBLE TWO-SIDED PENDULUM MIRROR
Gerhard Huther, Jena, Germany, assignor to VEB Carl
Zeiss Jena, Jena, Germany
Continuation of application Ser. No. 405,334, Oct. 19,
1964. This application Oct. 17, 1968, Ser. No. 788,668
Int. Cl. G01c 9/12
U.S. Cl. 356—250
5 Claims

ABSTRACT OF THE DISCLOSURE

A telescope, particularly for measuring or sighting as for geodetic purposes, comprising a rotatable tubular member in axial alignment with a light entrance aperture and having an objective mounted therein for rotation therewith, a collimating mark fixed near the optical axis of the objective, a pendulum mirror for automatic leveling of the sighting line of the telescope, the mirror having front and back reflecting surfaces and being positioned so that imaging rays entering the aperture pass through the objective to the mirror and are reflected therefrom back to the objective, means for focusing imaging rays traversing the objective onto the collimating mark, an eyepiece for viewing the collimating mark, and an optical system for directing images reflected from the mirror to the eyepiece.

---

Figure 1:
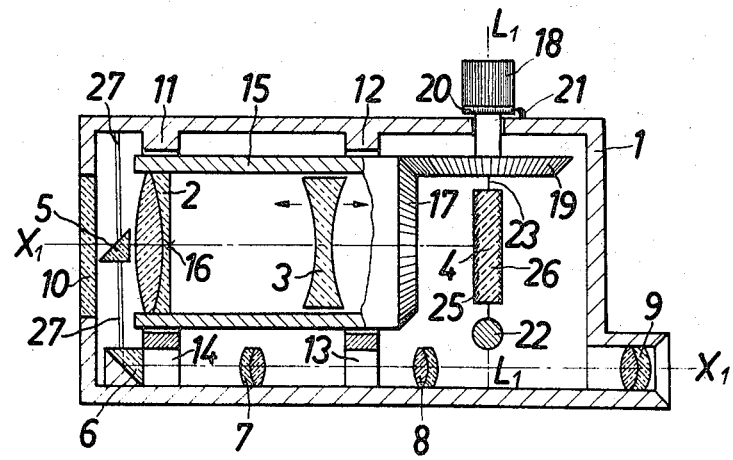

This application is a continuation of S.N. 405,334, filed Oct. 19, 1964, and now abandoned.

The present invention relates to measuring or sighting telescopes which have a collimating-mark carrier and an automatic sighting-line control and which can be used particularly for geodetic and precision-measuring instruments.

The precision and reliability of the measuring results depend largely on the adjusting accuracy and stability of the means influencing the sighting line, especially on that of the objective, the collimating-mark carrier and not least the sighting-line control. The position of the sighting line can be checked by suitable test methods and means, and detected divergences can with more or less precision be corrected according to the adjusting possibilities at disposal, but the operator will generally have to put up with a certain residual error. Moreover, in the hitherto known measuring and testing telescopes it is unavoidable and very disadvantageous that thermal and mechanical influences interfere with the means controlling the sighting line. Tests and readjustments repeated from time to time cannot satisfactorily cope with this phenomenon, it being necessary to pay particular attention to the methodical principles of precision measuring. Precision leveling, for example, requires that sightings in a definite sequence according to a definite scheme take place with due regard to equal sighting distances forward and backward. Carrying such methodical principles into practice is a severe handicap on both the economy and the precision of the measuring process.

The present invention aims at overcoming the foregoing disadvantages and has for an object the provision of a measuring or sighting telescope in which the sighting line is very stable and accurate and in which the cost of and the time taken by the methodics making for and guaranteeing high precision remain within strictly economic limits.

To this end, the present invention consists in a measuring or sighting telescope having a collimating-mark carrier and an automatic sighting-line control, characterized in that the collimating-mark carrier and the telescope objective can be rotated at least 180° about an axis parallel to the optical telescope axis and/or that the sighting-line control can be rotated 180° about a stationary axis which coincides approximately with the plumb line containing the locus of the instrument. In this telescope, two independent measuring values in extreme positions are obtained which have the same but opposite errors, and the mean of which is the accurate value, in analogy with the mean value obtained by observation through two telescopes set up at different places. Precision leveling, in particular, is thus possible without forward stationing and without strict equality of the sighting distances, the consequence being great operational economy and, because of the cutting of the time required for precision leveling, increased measuring accuracy and reliability.

A particularly simple embodiment of the invention is a telescope having a collimating mark on its objective and a sighting-line control at half the image distance. If this sighting-line control is a pendulum mirror, this mirror must have two parallel reflecting surfaces. The telescope is particularly suitable for high-precision work if the collimating mark in the rear nodal plane is rigidly connected to the objective and if there are no means influencing the ray path between objective and sighting-line control.

In a further embodiment of the invention, the telescope is particularly easy to handle by a driving means which rotates the objective and collimating mark and also the sighting-line control.

Precision sighting telescopes generally have an optical micrometer comprising plane-parallel plates or optical sliding wedges. According to a still further embodiment of the invention, the sighting or measuring telescope has only a simple micrometer, the objective and collimating-mark carrier being displaceable at right angles to the optical axis.

Figure 2:
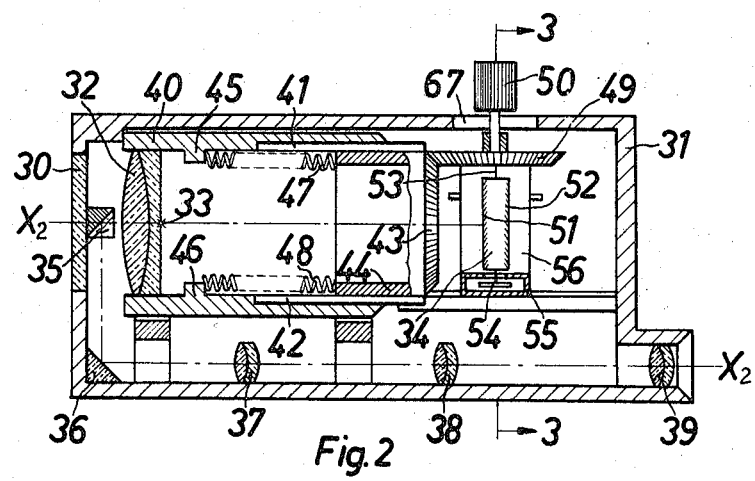
Figure 3:
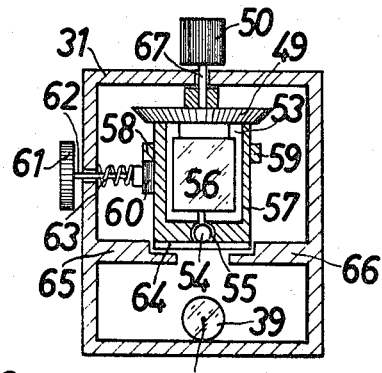
Figure 4:
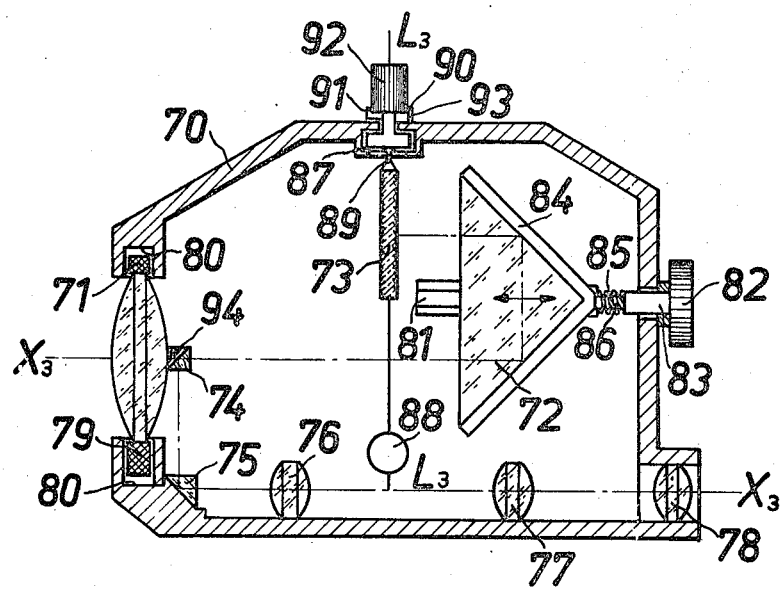
Figure 5:
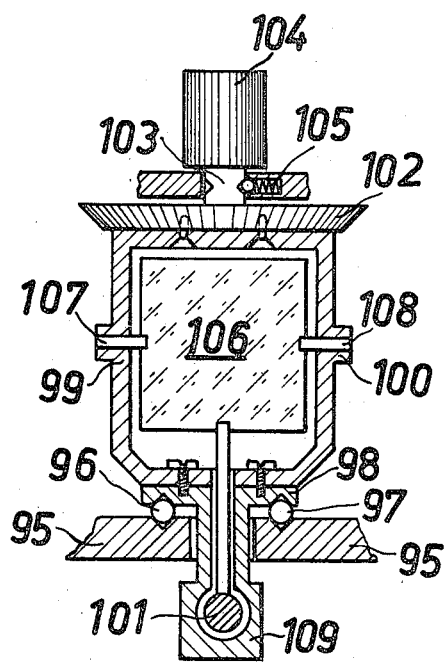

In order that the invention may be more readily understood, reference is made to the accompanying drawing which illustrates diagrammatically and by way of example three embodiments thereof, and in which:

FIG. 1 shows one embodiment in longitudinal section,
FIGS. 2 and 3 show another embodiment in longitudinal and cross-section, respectively,
FIG. 4 shows a third embodiment in longitudinal section, and
FIG. 5 shows the bearing of a sighting-line control.

In FIG. 1, a housing 1 contains an optical system comprising an objective 2, a focussing lens 3, a pendulum mirror 4, two right-angled prisms 5 and 6, two optical imaging elements 7 and 8, and an eyepiece 9. The axis $X_1$—$X_1$ of the optical system is a deviated axis. The housing 1 has a window 10 in the form of an optical adjustment wedge, which serves as light-entrance aperture.

Bearings 11, 12, 13, 14 in the housing 1 carry a tube 15 which contains the objective 2 and the focussing lens 3. The tube 15 is rotatable about its geometric axis, which coincides at least approximately with the part of the optical axis $X_1$—$X_1$ traversing the objective 2. The rear side of the objective 2 bears a collimating mark 16 which is as close as possible to the optical axis, and the focussing lens 3 is displaceable along the optical axis $X_1$—$X_1$. The end of the tube 15 remote from the objective 2 is fast with a bevel gear 17 which engages a bevel gear 19. By means of a milled head 18 outside the housing 1 the gear 19 is rotatable about an axis $L_1$—$L_1$. When the sighting-line control is in zero position, the axis $L_1$—$L_1$ coincides approximately with the plumb line containing the locus of the instrument. On the lower part of the cylindrical surface of the milled head 18 are adjustment marks 20 cooperating with an index 21 fast with the housing 1. The bevel gear 19 by means of strings 23 suspends a pendulum 22 carrying the pendulum mirror 4 which is plane and has on either side reflecting surfaces 25 and 26, respectively. The oscillations of the pendulum 22 are influenced by damping means (not shown).

The prism 5 is connected to the housing 1 by arms 27. The prism 6, the two optical elements 7 and 8, which produce an intermediate image, and the eyepiece 9 are also fast with the housing 1.

A light beam proceeding from a target traverses the window 10 and by means of the objective 2 and the focusing lens 3 and after reflection on the pendulum mirror 4 images the target in the plane of the collimating mark 16. This image by way of the rectangular deviating prism 6 and the optical elements 7 and 8 is projected in the image plane of the eyepiece 9.

When using the telescope, each target is aimed at twice. Between these two aimings, the mirror 4 is so rotated by turning the head 18 through 180° that the reflecting surface 26 becomes available for the second aiming, the reflecting surface 25 having been employed in the first aiming. Any fault in the adjustment of the pendulum mirror 4 is thus compensated, the errors in the two aimings being equal to each other. Turning the head 18 through 180° causes the bevel gears 19 and 17 to rotate 180° the tube 15 containing the objective 2. Accordingly, the influences of slight eccentricities of the collimating mark 16 relative to the optical axis $X_1$—$X_1$, as well as effects of errors of the sighting-line control on the measurement can be eliminated by averaging the results of the two aimings.

FIGS. 2 and 3 show a housing 31 having a window 30 and containing an optical system which is similar to the system shown in FIG. 1. The system in the housing 31 has an optical axis $X_2$—$X_2$ and comprises an objective 32, a collimating mark 33 thereon, a pendulum mirror 34, two rectangular prisms 35 and 36, two optical elements 37 and 38 producing an intermediate image, and an eyepiece 39. The prism 35 is cemented to the window 30, which is a transparent plane-parallel plate, the center of the hypothenuse surface of the prism 35 lying in the optical axis $X_2$—$X_2$, which also contains the collimating mark 33.

The objective 32 is rigidly mounted in a tube 40 containing grooves 41 and 42 which guide a tube 44 fast with a bevel gear 43 and displaceable against the pressure of springs 47 and 48 resting on stops 45 and 46 fast with the tube 40. The bevel gear 43 engages a bevel gear 49 which is mounted in the housing 31 and is rotatable by means of a milled head 50. The bevel gear 49 by means of tapes 53 suspends a mirror 34 having two plane-parallel reflecting surfaces 51 and 52. The pendulum mirror 34 has a damping device which consists of a piston 54 and a cylinder 55 and which by means of walls 56 and 57 is rigidly connected to the bevel gear 49. The lower ends of the walls 56 and 57 are interconnected by a circular plate 64 which is embedded in a guide comprising two guide rails 65 and 66 fast with the housing 31.

To the exterior sides of the walls 56 and 57 are fixed racks 58 and 59 parallel to the optical axis $X_2$—$X_2$. A pinion 60 mounted in the housing 31 and in connection with a hand wheel 61 rotates together with a shaft 62 and under the pressure of a spring 63 engages one of the two racks 58 and 59, the engagement in FIGS. 2 and 3 being with rack 58.

As in FIG. 1, the parallel rays of a light beam entering the objective 32 and deflected by the mirror 34 are united in the rear nodal plane of the objective, which contains the collimating mark 33. The prisms 35 and 36 and the optical elements 37 and 38 project an image of the target in the image plane of the eyepiece 39.

The telescope is operated as follows: It is focussed by rotating the hand wheel 61, so that the bevel gear 49 together with the pendulum mirror 34 and the damping means 54 and 55 are displaced along the guide rails 65 and 66, and the tube 40 along the grooves 41 and 42, an oblong hole 67 in the housing 31 allowing the milled head 50 fast with the bevel gear 49 to take part in this displacement. To protect the measurement from being influenced by errors due to deviation of the collimating mark 33 from the optical axis $X_2$—$X_2$ and to dislocation of the pendulum mirror 34, the telescope objective 32 and the pendulum mirror 34 after a first aiming by means of the reflecting surface 51 are rotated 180°, and the same point is then aimed at by means of the reflecting surface 52. To this end, the wheel 61 is disengaged from the pinion 60 against the action of the spring 63, and the bevel gear 49 together with the pendulum mirror 34 and the damping means 54 and 55 are rotated to make the pinion 60 engage the rack 59.

Focussing is possible also by means of the objective 32, the pendulum mirror 34 remaining stationary.

The embodiment shown in FIGS. 2 and 3 is particularly advantageous because the space between objective and sighting-line control and collimating mark are without any means influencing the ray path.

The embodiment FIG. 4 comprises a housing 70, an objective 71, a rectangular prism 72, a pendulum mirror 73, two rectangular prisms 74 and 75, two optical imaging elements 76 and 77, and an eyepiece 78. The mount 79 of the objective 71 is measurably displaceable in guides 80 in the housing 70. Parallel to the optical axis $X_3$—$X_3$, the prism 72 is displaceable along guides 81 in the housing 70 by means of a nut 83 fast with a hand wheel 82 and a spindle 85 fast with the prism mount 84. A spring 86 around the spindle 85 prevents backlash between the nut 83 and the spindle 85.

In the housing 70 is rotatably mounted a base 87 suspending a pendulum 88 and pendulum mirror 73 by means of crossed-tapes spring joints 89. Rotation of the pendulum 88 about its axis, which coincides at least approximately with the plumb line $L_3$—$L_3$, is effected by means of a milled head 92. The head 92 has two stop pins 90 and 91, so that its rotation can be interrupted by a stop 93 fast with the housing 70. The rectangular prism 74 bears a collimating mark 94 on its hypothenuse surface and is cemented to the rear of the objective 71.

The telescope is operated as follows: It is focussed by means of the prism 72. The pin 90 is given the position in which it contacts the stop 93, and the target (not shown) is aimed at. Slight vertical deviations of the collimating mark from the target point in the image can be rectified by vertically displacing the objective in its guides 80 (the displacing means being omitted in the drawing). Consequent lack of definition in the image plane of the eyepiece is overcome for example by displacement of the optical imaging element 76. Subsequently thereto, the pendulum mirror 73 is rotated 180°, so that the pin 91 comes in contact with the stop 93 and the other reflecting surface of the pendulum mirror 73 faces the hypothenuse surface of the prism 72. If necessary, the objective 71 can be vertically displaced.

The arrangement of the ray paths in the embodiment FIG. 4 provides the advantage of a very compact telescope.

The pendulum mirrors and their suspension, shown very schematically in FIGS. 1 to 4, are represented in detail in FIG. 5: A carrier 98 is mounted for rotation about the axis $L_5$—$L_5$ on balls 96 and 97 running on a base plate 95. The carrier 98 supports two pendulum bearings 99 and 100, a pendulum 101 in the form of a piston, and a damping cylinder 109. The pendulum bearings 99 and 100 are screwed to the carrier 98 and a bevel gear 102. A pin 103 connects a milled head 104 to the bevel gear 102. The head 104 by means of a click-stop 105 can be held in two positions displaced 180° relatively to each other. A pendulum mirror 106 connected to the piston 101 has trunnions 107 and 108 rotatable in the bearings 99 and 100.

The constructional examples shown in the drawings do not exhaust the idea underlying the invention, which is by no means restricted to any definite kind of sighting-line control or telescope. The pendulum can be a suspended or an inverted one. The optical construction admits single or multiple reflections on the oscillating and stationary optical elements. The telescope itself can be of the angular or the straight-vision type.

What is claimed is:
1. A telescope comprising a housing having a light-entrance aperture, a tubular member rotatably mounted within said housing, the geometrical axis of said tubular member being aligned with said aperture, means for rotating said tubular member, an objective fixedly mounted within said tubular member for rotation therewith, a collimating mark fixedly positioned with respect to said objective near the optical axis thereof, a pendulum mirror for automatically leveling the sighting line of said telescope, said pendulum mirror being suspended for oscillation within said housing to extend transversely of said optical axis and being spaced from said objective on the side thereof away from said aperture, whereby imaging rays entering said aperture pass through said objective to said mirror and are reflected therefrom back to said objective, said mirror having front and back reflecting surfaces, means for rotating said mirror about an axis normal to said optical axis for selectively aligning said reflecting surfaces to reflect said imaging rays, focusing means for focusing imaging rays traversing said objective on said collimating mark, an eyepiece for viewing said collimating mark, and an optical system for directing images reflected from said mirror to said eyepiece, said optical system comprising prism means fixedly mounted on said optical axis to divert said reflected images toward said eyepiece, and lens means in the path of said diverted images for producing an image of the plane of said collimating mark in the image plane of said eyepiece.

2. The telescope of claim 1 comprising means for interconnecting said means for rotating said mirror and means for rotating said tubular member whereby said tubular member and mirror rotate jointly.

3. The telescope of claim 1, wherein said focusing means comprises means for selectively moving said mirror in the direction of said optical axis.

4. The telescope of claim 1, further comprising means for damping the oscillations of said pendulum mirror.

5. The telescope of claim 1, wherein said means for rotating said mirror comprises a first shaft extending through a slot in said housing, and means for suspending said mirror from said shaft; wherein said focusing means comprises a second shaft extending through said housing, first and second racks mounted to rotate with said first shaft, and a pinion on the inner end of said second shaft adapted to selectively engage said first and second racks when said front and back reflecting surfaces respectively are aligned to reflect said imaging rays; wherein said tubular member comprises a first tube in which said objective is mounted, means inhibiting movement of said first tube towards said aperture, a second tube coaxial with said first tube and extending thereinto, and guide means inhibiting relative rotation of said first and second tubes; and wherein said means for rotating said tubular member comprises a first beveled gear on said first shaft, a second beveled gear on said second tube adapted to engage said first beveled gear, and spring means between said first and second tubes for urging said second beveled gear against said first beveled gear.

References Cited

UNITED STATES PATENTS

| | | | |
|---|---|---|---|
| 2,189,766 | 2/1940 | Unertl | 350—10X |
| 2,638,032 | 5/1953 | Kieffer et al. | 350—47 |
| 2,907,246 | 10/1959 | Farrand et al. | 88—1S |
| 2,978,950 | 4/1961 | Mandler | 88—14A |
| 3,059,520 | 10/1962 | Tsubokawa | 88—14A |

FOREIGN PATENTS

| | | | |
|---|---|---|---|
| 355,230 | 10/1905 | France | 88—1S |

RONALD L. WIBERT, Primary Examiner

O. B. CHEW II, Assistant Examiner

U.S. Cl. X.R.

350—10